United States Patent
Fushimi

[11] Patent Number: 5,903,780
[45] Date of Patent: May 11, 1999

[54] DATA SORTING DEVICE HAVING MULTI-INPUT COMPARATOR COMPARING DATA INPUT FROM LATCH REGISTER AND KEY VALUE STORAGE DEVICES

[75] Inventor: Shinya Fushimi, Tokyo, Japan

[73] Assignee: Mitsubishi Denki Kabushiki Kaisha, Tokyo, Japan

[21] Appl. No.: 08/834,738

[22] Filed: Apr. 3, 1997

[30] Foreign Application Priority Data

Apr. 26, 1996 [JP] Japan .................................. 8-107001

[51] Int. Cl.⁶ ....................................................... G06F 7/00
[52] U.S. Cl. ............................................................. 395/898
[58] Field of Search ..................... 395/898, 899

[56] References Cited

U.S. PATENT DOCUMENTS

| | | | |
|---|---|---|---|
| 3,713,107 | 1/1973 | Barsamian | 395/898 |
| 4,410,960 | 10/1983 | Kasuya | 395/898 |
| 4,567,572 | 1/1986 | Morris et al. | 395/898 |
| 4,651,301 | 3/1987 | Ballmer et al. | 395/898 |

FOREIGN PATENT DOCUMENTS 0343683  11/1989  European Pat. Off. .
63-304318  12/1988  Japan .

OTHER PUBLICATIONS

S. Fushimi et al., "GREO: A Commerical Database Processor Based on A Pipelined Hardware Sorter"; ACM SIGMOD International Conference pp. 449–452, 1993.
S. Fushimi, et al., "Database Processor GREO", Information Processing, vol. 33, No. 12, 1992.
Liu et al., "Parallel Merge Module for Combining Sorted Lists", IEEE Proceedings, vol. 136, No. 3, Part E, May 1, 1989, pp. 161–165.

Primary Examiner—Richard L. Ellis
Attorney, Agent, or Firm—Leydig, Voit & Mayer, Ltd.

[57] ABSTRACT

A data storage device for storing input data strings includes a comparator having (K+1) input ports for inputting K continuous sets of comparison data (K is an integer and at least 2) of the data strings for comparing data from K ports; and a controller for selecting the input port input to the comparator. A sort processor of the present invention provides a high performance sorting process and a high density sort processor in a semiconductor integrated circuit.

14 Claims, 9 Drawing Sheets

| STAGE NUMBER | PRIOR ART (K=2) | | | PRESENT INVENTION (K=3) | | | PRESENT INVENTION (K=4) | | | PRESENT INVENTION (K=7) | | | PRESENT INVENTION (K=8) | | |
|---|---|---|---|---|---|---|---|---|---|---|---|---|---|---|---|
| | REQUIRED AMOUNT | MOUNTED CAPACITY | NUMBER OF DRAMS | REQUIRED AMOUNT | MOUNTED CAPACITY | NUMBER OF DRAMS | REQUIRED AMOUNT | MOUNTED CAPACITY | NUMBER OF DRAMS | REQUIRED AMOUNT | MOUNTED CAPACITY | NUMBER OF DRAMS | REQUIRED AMOUNT | MOUNTED CAPACITY | NUMBER OF DRAMS |
| 1 | 64B | 8MB | 4 | 64×2B | 8MB | 4 | 64×3B | 8MB | 4 | 64×6B | 8MB | 4 | 64×7B | 8MB | 4 |
| 2 | 128B | 8MB | 4 | 192×2B | 8MB | 4 | 256×3B | 8MB | 4 | 448×6B | 8MB | 4 | 512×7B | 8MB | 4 |
| 3 | 256B | 8MB | 4 | 576×2B | 8MB | 4 | 1K×3B | 8MB | 4 | 3.1K×6B | 8MB | 4 | 4K×7B | 8MB | 4 |
| 4 | 512B | 8MB | 4 | 1.7K×2B | 8MB | 4 | 4K×3B | 8MB | 4 | 21K×6B | 8MB | 4 | 32K×7B | 8MB | 4 |
| 5 | 1KB | 8MB | 4 | 5.1K×2B | 8MB | 4 | 16K×3B | 8MB | 4 | 150K×6B | 8MB | 4 | 256K×7B | 8MB | 4 |
| 6 | 2KB | 8MB | 4 | 15K×2B | 8MB | 4 | 64K×3B | 8MB | 4 | 1M×6B | 8MB | 4 | 2M×7B | 16MB | 8 |
| 7 | 4KB | 8MB | 4 | 46K×2B | 8MB | 4 | 256K×3B | 8MB | 4 | 7.2M×6B | 48MB | 24 | 16M×7B | 112MB | 56 |
| 8 | 8KB | 8MB | 4 | 137K×2B | 8MB | 4 | 1M×3B | 8MB | 4 | 50M×6B | 304MB | 152 | | | |
| 9 | 16KB | 8MB | 4 | 410K×2B | 8MB | 4 | 4M×3B | 16MB | 8 | | | | | | |
| 10 | 32KB | 8MB | 4 | 1.2M×2B | 8MB | 4 | 16M×3B | 48MB | 24 | | | | | | |
| 11 | 64KB | 8MB | 4 | 3.6M×2B | 8MB | 4 | | | | | | | | | |
| 12 | 128KB | 8MB | 4 | 11M×2B | 24MB | 12 | | | | | | | | | |
| 13 | 256KB | 8MB | 4 | 33M×2B | 72MB | 36 | | | | | | | | | |
| 14 | 512KB | 8MB | 4 | | | | | | | | | | | | |
| 15 | 1MB | 8MB | 4 | | | | | | | | | | | | |
| 16 | 2MB | 8MB | 4 | | | | | | | | | | | | |
| 17 | 4MB | 8MB | 4 | | | | | | | | | | | | |
| 18 | 8MB | 8MB | 4 | | | | | | | | | | | | |
| 19 | 16MB | 16MB | 8 | | | | | | | | | | | | |
| 20 | 32MB | 32MB | 16 | | | | | | | | | | | | |
| TOTAL | 64MB | 192MB | 96+20 | 96MB | 184MB | 92+13 | 94MB | 128MB | 60+10 | 354MB | 376MB | 200+8 | 128MB | 168MB | 56+7 |

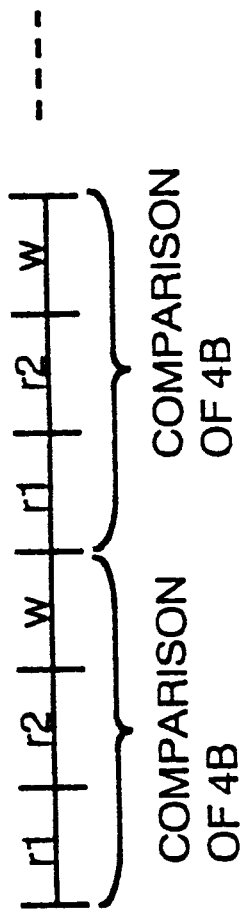
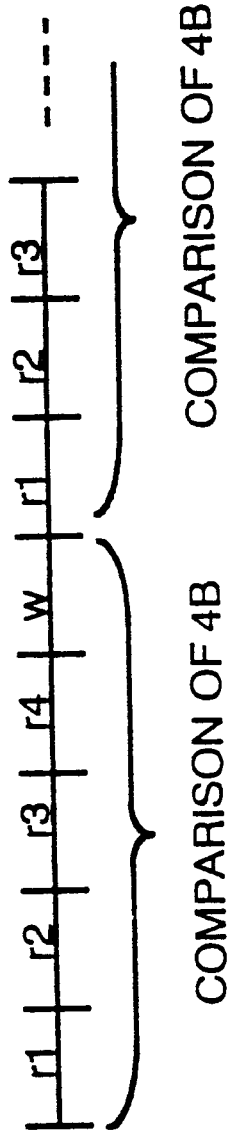
FIG. 10A
(PRIOR ART)
FIG. 10B
(PRIOR ART)

DATA SORTING DEVICE HAVING MULTI-INPUT COMPARATOR COMPARING DATA INPUT FROM LATCH REGISTER AND KEY VALUE STORAGE DEVICES

BACKGROUND OF THE INVENTION

1. Field of the Invention

This invention relates to a sort processor and a sort processing device for rearranging a large quantity of data, i.e. sort processing in data base processing and business data processing. In this specification, a sort processor and a sort processing device are differentiated. A sort processor is defined as a single processor for performing a portion of a sorting process, on the other hand, a sort processing device is defined as a device for performing a complete sorting process using multiple sort processors connected in series.

2. Description of the Prior Art

FIG. 6 shows a computer system equipped with a conventional sort processing device, which is disclosed in "Information Processing", Vol. 33, No. 12, 1992, p.p. 1416–1423. In the figure, the computer system comprises a sort processing device 1, a system bus 2 of a host computer, a main storage device 3 of the host computer, a CPU 4 of the host computer, a disk drive 5 for storing data in the host computer, and a host computer 6.

Operation of the conventional sort processing device is explained by referring to FIG. 6. Firstly, an outline of the operation is explained. When a demand for data processing is generated in the host computer 6, the CPU 4 in the host computer continuously extracts data from the disk drive 5, where the object data are stored, and then continuously transmits the extracted data to the sort processing device 1 via the system bus 2. At this time, the main storage device 3 of the host computer 6 is used as an input-output buffer area as needed. The sort processing device 1 performs sort processing when the data is inputted, and returns the result to the host computer 6 via the system bus 2. The host computer 6 stores the returned result data in the disk drive 5 in the same manner as that of data inputting. The inputting of the sort processing device 1 and the outputting of result data from the sort processing device 1 are performed in parallel.

Secondly, the detailed operation of the sort processing device is explained below. The sort processing device 1 is continuously inputted with a sequence of data transmitted by the host computer 6, rearranges the inputted data in an assigned order, and returns the result to the host computer 6. This operation is explained using FIG. 5 disclosed in the above-mentioned "Information Processing". FIG. 7 shows the construction of the sort processing device 1 of FIG. 6, and the sort processing device 1 is constructed by serially connecting sort processors 11, 12, 13 and 14. The respective processors 11–14 are connected to the data storage devices 15, 16, 17 and 18. A host computer interface 21 is used for exchanging data and instructions with the host computer 6, and a controller 19 is used for controlling the entire sort processing device 1. The sort processors 11–14 are called respectively a sort processor in a first stage, a sort processor in a second stage, and a sort processor in a third stage. A sort processor in an ith stage has a storage capacity corresponding to $2^{i-1}$ data values.

An operation is explained below using an example where data are inputted to the sort processing device 1 in the order of "8, 2, 1, 3, 5, 7, 6, 4".

Firstly, the sort processor 11 of the first stage extracts the inputted data in groups of two rearranges the data in an assigned order, and transmits the rearranged data to the sort processor of the next stage. The sorted groups are inputted to the next stage in the order of (8,2), (3,1), (7, 5), (6,4), . . . .

As these numbers show, in the sort processor 11 of the first stage, the order "1, 3" of the inputted data is rearranged, and the sorted paired data in the order of (3,1) is outputted. The sorted combination of data hereinafter referred to as a data string or a string. The sort processor 12 of the second stage inputted with these sorted data strings, merges successive pairs of the strings, and transmits the merged data strings sorted for four data values to the next sort processor 13. The resulting strings are (8, 3, 2, 1), (7, 6, 5,4), . . . . As explained above, as a result of sort processing by the sort processor 12 of the second stage, the inputted data strings (8, 2) and (3, 1) are merged to output the data string (8, 3, 2, 1). The sort processor 13 of the third stage is inputted with those data strings sorted for four data values, merges successive pairs of strings and transmits the merged data string sorted for eight data values to the sort processor 14 of the next stage. The result of the sorting is (8, 7, 6, 5, 4, 3, 2, 1), . . . . The sort processor 14 and succeeding sort processors perform similar processing.

It is possible for the sort processors of the respective stages to start the sorting process before the sort processor of the preceding stage completes its sorting process. Therefore, when data is continuously inputted to the sort processor of the respective stages, the sort result is outputted in parallel with the data input after some delay.

In this manner, the "n" sort processors carry out the rearrangement, that is, the sorting of $2^n$ data. The respective sort processors utilize the connected respective data storage devices 15, 16, 17 and 18 as a storage areas in their comparison and merge processes.

Secondly, an operation of the sort processors is explained in reference to FIG. 9 which shows the construction of the conventional sort processor disclosed in "Information Process" Vol. 31, No. 4, 1990, p.p. 457–465. FIG. 9 shows only the inside of the sort processor 12 for the simplicity of the explanation, however, the inside of the other sort processors are the same as that of the sort processor 12. The sort processor of FIG. 9 comprises a comparator 120 for comparing data strings, respective latch registers 121 and 122 for temporarily storing a portion of compared data, data input ports 123 and 124 for inputting the data to the comparator 120, and a controller 125 for controlling operations of the sort processors. The latch registers 121 and 122 have a data size equal to the comparison data size of the comparator 120 and a data width equal to that of the input ports 123 and 124. In the following explanation, the data size is assumed to be 4 bytes. An input bus 127 inputs the data from the preceding sort processor 11, and a data and address bus 128 exchanges data with the data storage device 16 connected to the sort processor 12.

The sort processing by the sort processor 12 is explained in detail below. The explanation is done using an example of a case when the sort processor 12 is inputted with data strings (8, 2), (3, 1), . . . in sequence from the sort processor 11 of the preceding stage, the sort processor 12 merges the data strings to a data string (8, 3, 2, 1), . . . and outputs the merged data string to the sort processor 13 of the next stage.

First of all, the data string (8, 2) which is firstly inputted is stored as it is in the data storage device 16 connected to the sort processor 12. Secondly, the data "3" of the data string (3,1) is inputted into the sort processor 12, and stored in the data storage device 16 in the same manner. Then thirdly, the top data "8" in the first data string (8, 2) and the top data "3" of the data string (3, 1) are loaded from the data storage device 16 to the latch registers 121 and 122 for every 4 bytes, and comparison takes place in the comparator 120. These data are compared for every 4 bytes in sequence in this comparison.

In the sort processing, if the ascending order is given as an order assignment for the sort key, the smaller comparison result is outputted first. If the descending order is given as an order assignment, the larger comparison result is outputted first. The controller 125 controls the ascending/descending order for the sort key which begins from a top byte of a data. When the comparison result is determined, the data is outputted to the next sort processor 13. In parallel with this comparison process, the top data "1" of the second data string (1, 3) is stored in the data storage device 16.

In this case, as a result of the comparison, the data "8" is outputted to the sort processor 13 of the next stage. Therefore, in the following comparison, the data "3" and the data "2", which follows the "8" of the data string (8, 2), are compared. The comparison is carried out by inputting the data "3" and the data "2" to the respective latch registers 121 and 122 from the data storage device 16 for every 4 bytes, and by comparing the data for every 4 bytes.

Because a conventional sort processing device is constructed in the way explained above, there have been problems such as follows:

(1) In order to improve the performance of the sort processing, it has been difficult to increase the number of data values which the sort processors can compare at one time, for example, 4 or 8. For instance, "Electric Communication Society Article Magazine", Vol. 1, J 66 D, No. 3, 1983/3, p.p. 332–339, discloses that, in theory it is possible to merge K input strings into one. However, in the conventional sort processor, the comparison result is controlled by information telling which of the data inputs is larger, and the above reference does not disclose a way to increase the numbers which the sort processors can compare at one time to 4 or 8, which is larger than 2. Therefore it has been impossible to perform the sorting process efficiently by simply changing the number of data values that the sort processor can compare at one time to 4 or 8, rather than 2.

(2) For example, in the construction of a conventional art, if the number of the latch registers 121 and 122 increases to 4 or 8, it has been necessary in the comparison process to read out the K data, which becomes the object of the comparison, for every 4 bytes from the data storage device 16. That is to say, during the comparison of 4 bytes, it has been necessary to access the data storage device 16 4×K times. Thus, the more K increases, the more access to the data storage device 16 is needed, and this results in deterioration of the performance.

As illustrated in FIG. 10 (a) showing the conventional art, for the data flowing on the bus 128 to the data storage device 16, data access is carried out every time a comparison takes place. In other words, a data is read out (r1) to the latch register 121, then another data value is read out (r2) to the latch register 122. These data are compared at last, and the comparison result is outputted to the sort processor 13 of the next stage. At the same time, the data inputted from the sort processor 11 of the preceding stage is inputted (w) to the data storage device 16. The other sort processors are synchronously performing a similar operation to the respective data storage devices in parallel. Therefore, in this case, one comparison takes place for three cycles for a physical comparative unit 4 B (Byte).

In contrast, if the number is extended to, for example, K=4, a comparison takes place for four data in the cycles of r1, r2, r3, r4 and w. In this case, the top processor ($P_1+P_2$) functions in the same manner as the combination of the sort processors 11 ($P_1$) and ($P_2$). That is, the top processor performs the process to merge the four data. Therefore, 5 cycles are necessary for the comparison of the four bytes. As explained above, in general, when the comparison of the K data is performed at one time, it takes a time of (K+1) cycles per 4 B, and this result in deterioration of performance.

(3) In order to avoid this deterioration of performance, it has been considered in store the key values a buffer and avoid accessing to the data storage device. However, in practice, this approach also has some problems. If K buffers are used in a comparison of the K data, it is necessary to read out the succeeding data again for the buffer of the key value corresponding to the outputted data, and then to start the comparison. Therefore, time is wasted for reading out the key value between the comparison processes, and this also deteriorates performance.

(4) Generally, in sort processing, it is also necessary to merge multiple fields inside a record, to independently assign the ascending/descending order to the respective fields, and to rearrange the data according to the assigned order. Therefore, the controller in the sort processor is required to judge the ascending order or descending order for the respective multiple key fields, and to perform an operation according to the order. Therefore, it has been a problem that the hardware logic becomes complicated.

(5) In addition, in a case of realizing a sort processor using LSI, there is a limitation on the number of pins within an LSI package. That is, it is possible to realize a comparator and a control device in a sort processor by a relatively simple hardware logic to form an LSI. However, on the other hand, although LSI technology advances and makes it possible to integrate a great amount of a hardware logic in one LSI, the sort processor of the above-mentioned conventional art cannot be easily integrated in one LSI, because of the limitation by the number of the pins provided in one LSI.

For example, it is currently possible to integrate two or more sort processors according to the conventional art in an LSI. On the other hand, the number of the pins is limited. More concretely, in the above case, the size of the three buses used for connecting with the external devices becomes as follows:

A data input bus 126 from the preceding stage: 32 bits,

A data output bus 127 to the succeeding stage: 32 bits,

An address and a data bus of the data storage device: the address bus: 32 bits, the data bus: 32 bits.

In addition to the numbers above, when presumed from the design of an ordinary LSI, the power supply, the power source, the ground and other control signals require approximately 30 pins, and a total of 160 LSI external pins are necessary. For example, in case that two sort processors are integrated in a single LSI (in the above situation, the sort processors 11 and 12 are integrated in one LSI), the 32 pins in the data bus connecting the sort processors are unnecessary because they are realized internally. But, about 220 pins including other pins are necessary. In general, in order to integrate N sort processors into one LSI, approximately 32+32+32633 2×N+30 pins are required. If N is 4, the number of total pins required is approximately 350. That is, if it is possible to integrate multiple sort processors in a single LSI according to increases in the degree of the integration, it is not possible to integrate multiple sort processors in a single LSI, because the number of the pins in an LSI package is limited.

(6) As a result, when realizing a sort processing device, only extremely few, 1 or 2, sort processors are integrated in a single LSI although there is extra integrating capacity. Therefore, the sort processing device is constructed from relatively many LSIs of sort processors, and this results in an increase in scale.

(7) Furthermore, there is another problem that the hardware scale of data storage device connected to the sort processors also becomes large. For instance, in the respective sort processors, if the number of the data compared at one time is two, the capacity of the data storage device connected to the respective sort processors doubles as the stage proceeds. However, if the capacity of the sort processor of the first stage is approximately 64 bytes, the capacity increases such as 128 bytes in the second stage, 256 bytes in the third stage, 32K bytes in the tenth stage, and 32 M bytes in the twentieth stage. In contrast, a current DRAM has the capacity of 16 M bits or 64 M bits and the access width of 8 bits for one chip. In order to realize the above data storage device with small capacity, if the data storage device with the width of 32 bits is used for example, it is necessary to use at least 4 DRAMs (with access width of 8 bits). 4 DRAMs of 16 M bits are required for the respective stages from the first through the eighteenth stages, and a total of 72 DRAMs is required. The total capacity of those DRAM chips is 144 MB, but only 16 MB is used in reality. Because many DRAM chips are used with low efficiency, the hardware scale becomes large.

SUMMARY OF THE INVENTION

It is an object of the present invention to solve the above problems, and to improve the processing performance by comparing K (K is more than 2) data or data strings simultaneously without increasing the access demand on the data storage device.

It is another object of the present invention to make the sort processing device small in size releasing the limitation on the number of the pins in the LSI package, by reducing the number of pins needed in the LSI package, by constructing a comparator to compare K data or data strings simultaneously, by reducing the number of LSI sort processors constructing a sort processing device, and by reducing the number of the memory chips of the data storage device.

It is a further object of the present invention to make the assignment of an ascending/ descending order possible for every sort key in the sort processing, and to make it possible to assign the internal process within a sort processor only in an ascending order or only in the descending order, and to simplify the internal construction of a sort processor.

According to one aspect of the invention, a sort processor for rearranging the data strings to an assigned order comprises a data storage device for storing input data strings; a comparator having (K+1) input ports for inputting comparison object data of continuous K sets (K: integral number larger than or equal 2) of the data strings for comparing data from K ports; and a controller for selecting the input port which is inputted to the comparator.

According to another aspect of the invention, a sort processor comprises K input ports which are equipped with respective data storage devices for storing K data which are object for comparison out of (K+1) ports of the comparator, the remaining input port is equipped with a register, and K data are compared by comparing the data inputted from the (K−1) input ports out of the K input ports with the data inputted from the register.

Preferably, data storage devices stores only key values of data compared. The K data strings corresponds to K key storages for storing the key values of the K data, respectively.

According to a further aspect of the invention, in a pre-processing for the comparison process, the controller stores the key values of first K−1 data out of the data in the continuous K data strings which are the object of comparison in the (K−1) key value storage devices out of K key value storage devices, and at the same time when the top portions of the key value of the K data are stored in the register, the controller selects input ports corresponding to the (K−1) key value storage devices and an input port connected to the register to start comparison processing, and stores K-th data in the K-th key value storage device.

According to a further aspect of the invention, at the beginning of the first comparison processing, the controller stores the top data of the respective data strings in the data storage device when the controller stores the (K−1) data strings out of K sort strings which are object of the comparison, in the data storage device, and stores in parallel the key values corresponding to the respective data to the key value storage devices.

According to a further aspect of the invention, in the comparing processes subsequent to the first comparison process in the comparison processes performed repeatedly by the respective sort processors, the comparator judges which data are to be arranged in an assigned order from the results of comparison of the key data of K data, and outputs these judged data to the sort processor in the next stage, and then the comparator stores the key value of following data instead of the outputted data in the register to start the next comparing process, and stores this key value in the key value storage device, in which the key value of the outputted data has been stored, to perform a sort processing in parallel.

According to a further aspect of the invention, in case that the data stored in the register is outputted according to the result of comparison by the comparator, the controller stores the key value of the data following to the outputted data in the data string which the outputted data belongs to in the register to start the comparing process of the comparator, at the same time the key value of this data following to the outputted data is stored in the key value storage device where the key value of the outputted data had been stored.

According to a further aspect of the invention, when there is no more data instead of the outputted data as a result of comparison in the comparator, the controller does not thereafter select the input port of the comparator corresponding to the key value storage device in which the key value of the data had been stored.

Preferably, a comparator is constructed to select the smallest data or the largest data. The value of the K is defined as $K=2^n$ (n is an integer larger than or equal to 2). The plurality of the sort processors are integrated in one semiconductor chip. The plurality of the sort processors are connected in series.

According to a further aspect of the invention, a sort processor further comprises a key converter for inverting the bit of key values having a different assignment from the comparation function of the comparator to transmit the inverted key value to a sort processor of a first stage.

According to a further aspect of the invention, sort processing device comprises a plurality of sort processors including a data storage device for storing input data strings, a comparator for comparing the size of continuous comparison object data of the data strings, and a controller for controlling the data storage device and the comparator, wherein the plurality of sort processors operate in parallel and repeatedly preforms comparation processes using respective comparator in order to perform sorting process on a plurality of data; and a key converter for inverting the bit of key values having a different assignment from the comparation function of the comparator to transmit the inverted key value to a sort processor of a first stage.

BRIEF DESCRIPTION OF THE DRAWINGS

FIG. 5 shows a relationship between the data storage device when the data compared at one time are changed and the necessary number of DRAMs.

FIGS. 10a and 10b explains the performance deterioration which occurs in a conventional sort processor when the number of data compared at one time is increased from 2 to more than 2.

DETAILED DESCRIPTION OF THE PREFERRED EMBODIMENTS

Figure 1:
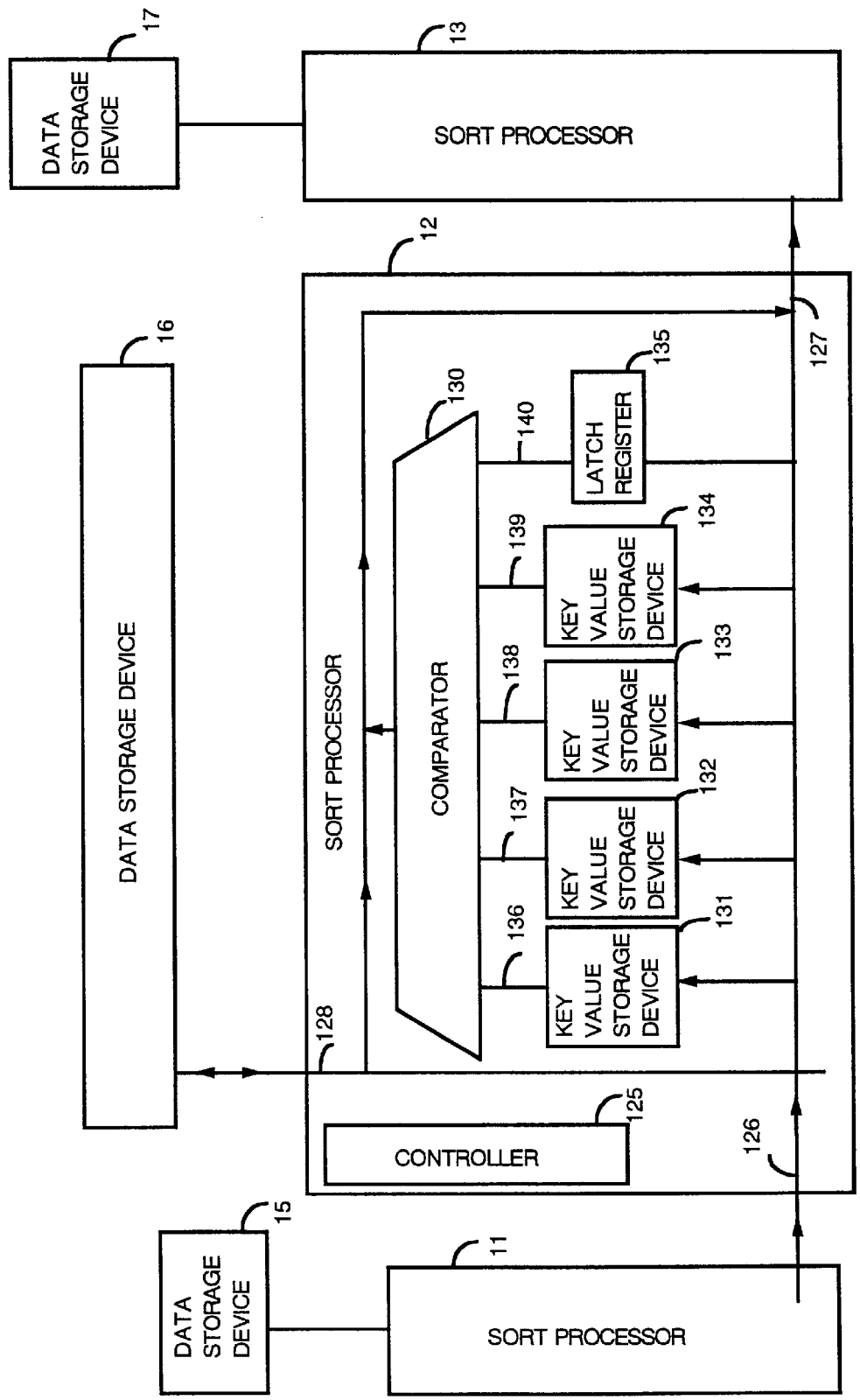
FIG. 1 shows one embodiment of a sort processor according to the present invention.

In this embodiment, it is assumed that the number of data that are compared at one time is K=4 and the data width is 4 bytes. FIG. 1 shows a relationship of the connection between sort processors according to the present invention. The construction of FIG. 1 comprises sort processors 11, 12 and 13, and the respective sort processors comprise data storage devices 15, 16 and 17 for storing data strings to be sort processed. The respective sort processors 11, 12 and 13 comprise four key value storing areas 131–134 for storing sort keys (referred to as key value below), a latch register 135, a comparator 130 and a controller 125 for controlling the entire sort processor. The comparator 130 can be realized by multiple comparators with 2 inputs without using a special circuit construction. The latch register 135 may be constructed from a general register.

Moreover, an input bus 126 is inputted with data from the sort processor 11 of the preceding stage, an output bus 127 outputs data to the sort processor 13 of the succeeding stage, and an address and data bus 128 exchanges data with data storage device 16 connected to the sort processor 12. The comparator 130 includes input ports 136–140.

The latch register 135 is a register having a bit width which the comparator 130 compares at one time. The key value storage devices 131–134 comprise devices such as registers and memory elements having a capacity to store all the key data values. The key value storage devices 131, 132, 133 and 134 are referenced as a first, a second, a third and a fourth key value storage device, respectively, for convenience of explanation.

First of all, an operation of the sorting process of the sort processor, constructed in the above-mentioned manner, is explained below.

(1) The controller 125 of the sort processor stores the key value of compared individual data in the corresponding key value storage devices (131–134).

(2) In case that one data is outputted as a result of the comparison, the controller 125 inputs the key value of the data inputted from the data storage device 16 to the latch register 135, for example for every four-byte unit, and performs a comparison. Then, the same data are inputted to empty key storage devices in sequence.

(3) At the start of a first comparing process performed repeatedly in the respective sort processors, the key values of the three data within the four data which are to be compared are respectively stored in the three key value storage devices (131–133) of the four key value storage devices (131–134). Then the controller 125 in the sort processor selects the input ports (136–138) which correspond to the these three key value storage devices (131–133) and the input port 140 connected to the latch register 135, and starts the comparing process at the same time when the top portion of the key value of the fourth data is stored in the latch register 135. In parallel, the key value of the fourth data is stored in the fourth key value storage device 134.

(4) In comparing processes other than the first comparing process performed repeatedly in the respective sort processors, the comparator 130 judges the smallest data value (in case of the ascending order sort) from the results of the comparison between the key data values of four data, and the smallest data value is outputted. The key value of a next data which replaces the outputted data is inputted to the latch register 135, and a comparing process begins. In parallel, the key value of the data is stored in the key value storage device in which the key value of the outputted data has been stored, and then the sorting is performed in the ascending order.

(5) In the case of a descending order, the largest data is determined from the results of the comparison, and the sort in the descending order is achieved by outputting the largest data.

(6) In case that the data value which is inputted to the latch register 135 and is compared, and the data which is stored at the same time in the key value storage device is selected as a result of a comparison of an ascending or descending order and is ouputted, the top portion of the key value of the next data replaced by the data is inputted to the latch register 135 in the same manner to start a comparison. The key value of the next data is inputted to the key value storage device where the outputted data has been stored. In case that this inputted data is not selected nor outputted as a result of the comparison, the key value of a following data which replaces the outputted data is stored in the latch register 135 to start a comparison. In parallel, the key value of this stored data is also stored in the key value storage device where the key value of the outputted data has been stored.

(7) In case that there is no more data for replacing the outputted data, the controller 125 does not select the input port of the comparator 130 corresponding to the key value storage device where the key value of the outputted data has been stored, so that the key value of this data does not become an object of comparison any longer.

Figure 2:
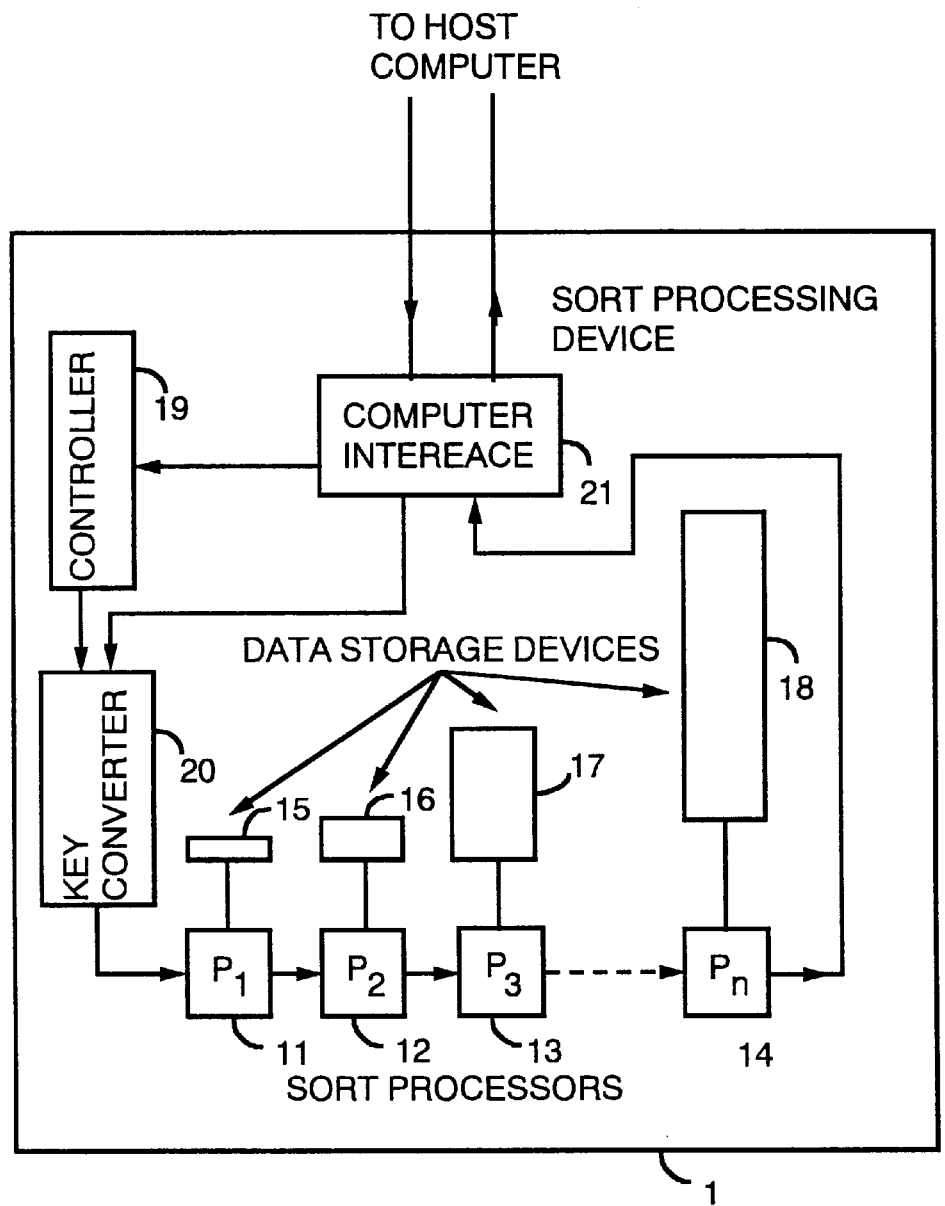
FIG. 2 shows a construction of a sort processing device constructed using sort processors according to the present invention.

FIG. 2 shows a sort processing device constructed with the sort processors according to the present invention. A sort processing device 1 comprises sort processors 11–14, data storage devices 15–18 for the respective sort processors, an interface portion 21 for exchanging data and processing demand with the host computer, a key converter 20 for converting the key value of data, and a sort processing device controller 19 for controlling the sort processing device 1 as a whole. The key converter 20 is constructed to connect to the sort processor 11 of the first stage.

The present embodiment is explained using figures below. The process in which data is inputted to the sort processing device 1 from the host computer, and the sort processing device 1 which sorts and returns the data to the host computer are the same as those explained above, therefore the explanation is omitted here.

Figure 6:
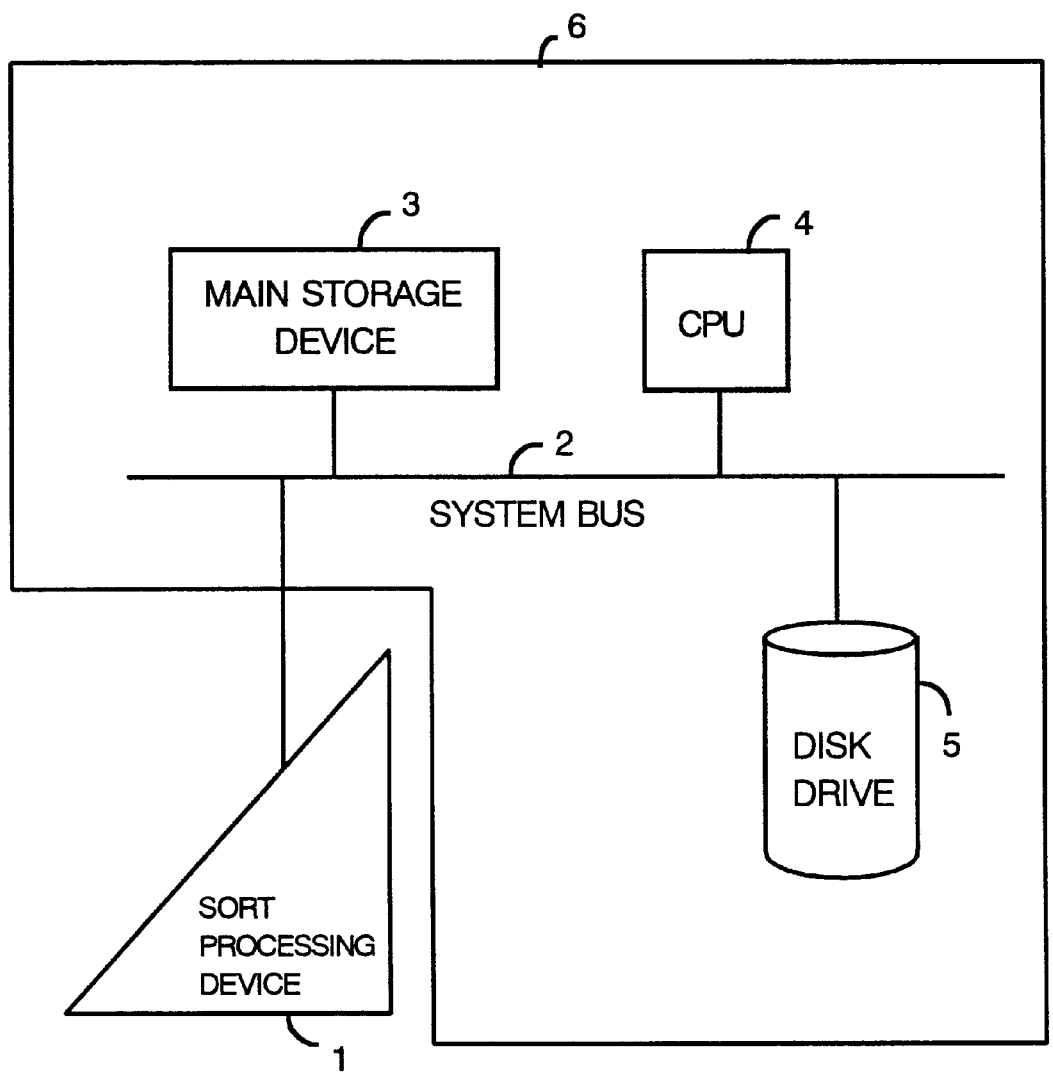
FIG. 6 shows a connection between a conventional sort processing device and a host computer.
Figures 7, 8:
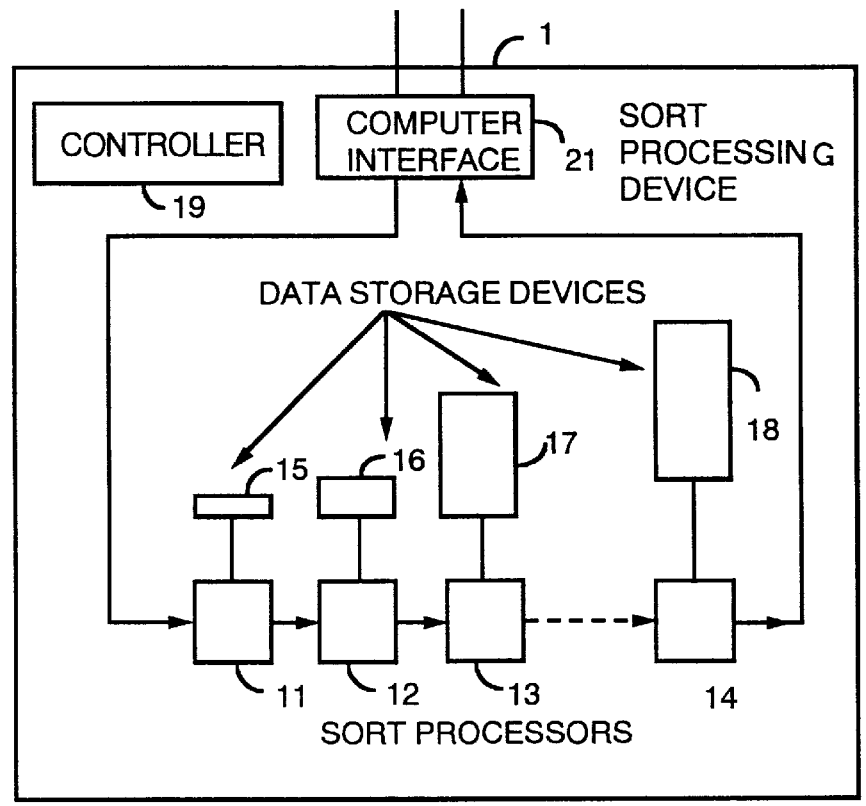
FIG. 7 shows a construction of a conventional sort processing device.
FIG. 8 shows a sorting process by a conventional sort processing device.
Figure 9:
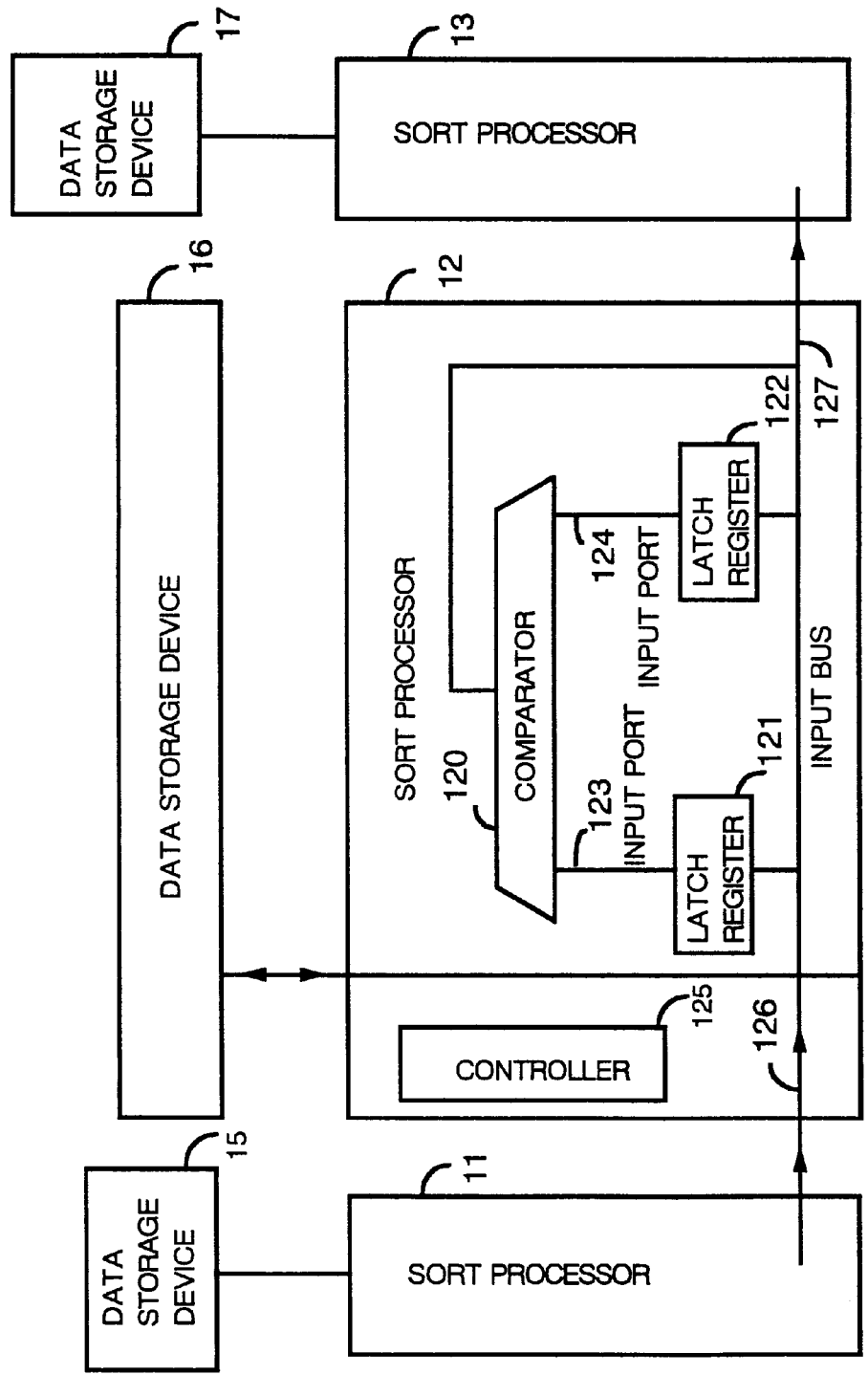
FIG. 9 shows a sort processor used in a conventional sort processing device.

First of all, the construction and the operation of the key converter 20 are explained using FIG. 2. The construction of FIG. 2 is similar to that of FIG. 7 in which the conventional example is explained. However, the capacity of the data storage devices 15, 16, 17 and 18 added to the respective sort processors, and the internal structure of the respective sort processors in FIG. 2 are different from those of the conventional art in FIG. 6. The sort processing device 1 is continuously inputted with a series of data transmitted from the host computer, rearranges, and returns the result to the host computer. In the sort processing device 1, the sort processor group 11, 12, 13 and 14 is linearly connected to the data storage device group 15, 16, 17 and 18 which is added to the respective sort storage group, and the key converter 20 is connected prior to the sort processor 11 in the first stage.

In the sort processing, the rearrangement of data is performed based on the key values of the data. For example, assuming that the format of an object data is as shown below and only the sorting process in a descending order is possible, it is explained below how data are rearranged.

Data format: key 1+key 2+key 3+non-key data;

Where, the key 1 and key 3 are assumed to be assigned as an ascending order, and the key 2 is assumed to be assigned as a descending order.

The controller 19 receives the assignment of either ascending or descending orders regarding the keys 1–3 from the host computer. Then the controller 19 interprets the order and controls the key converter 20 to output the data to the first sort processor 11 by inverting their bits, regarding the key 1 and key 3 out of the inputted respective data. This process makes it possible to sort multiple keys having both ascending and descending orders, as shown in the example below, even if the sort processors only have the capability of sorting in a descending order.

A concrete example is explained below. For instance, if two data are "2" and "4", those two data are expressed in binary numbers as "0010" and "0100". Then if those numbers are sorted in an ascending order, it becomes necessary to output these data in the order of "2", "4". While, if those two data are bit-inverted, the expressions in the binary number become "1101", "1011", and these binary numbers in decimal expressions are "13" and "11". Therefore, if the "13" and "11" are sorted in a descending order, the resulting order becomes the same.

Similarly, in case when sort processors only have the function for the ascending order, the controller 19 sends an order to the key converter 20 to perform the bit-inversion on, in this example, the key 2.

An operation of the sort processor is explained below using a concrete example. The sort processors are respectively defined from the top as a sort processor of a first stage ($P_1$), a sort processor of a second stage ($P_2$), a sort processor of a third stage ($P_3$) and so on. A sort processor of a ith stage has a data storage device having a capacity for the (K–1) $K^{i-1}$ data. The following explanation is proceeded by assuming K=4. As an example of the operation, data are inputted to the sort processing device 1 in the order of:

8, 2, 1, 3, 5, 7, 6, 4, 9, 0, 8, 5, 1, 10, 3, 4, . . .

The sort processor 11 of the first stage from the top extracts the inputted data for every four data, and rearranges and transmits those four data to the sort processor 12 of the succeeding stage.

Where, the data "8", "2", "1" . . . do not mean that they are expressed in the decimal numbers, but they are the data constructed by the key value portions and the data body portions, however, there are cases that data are constructed only from the key value portion, and the numbers simply shows the size of the data. The data sorted for every four data strings are inputted to the sort processor 12 of the succeeding stage in the order of:

(8, 3, 2, 1), (7, 6, 5, 4), (9, 8, 5, 0), (10, 4, 3, 1), . . . .

The sort processor 12 of the second stage is inputted with those data grouped by four data, takes those grouped data for every four data, transmits the data sequences sorted by every 16 to the sort processor 13 of the succeeding stage. The result is:

(10, 9, 8, 7, 6, 5, 5, 4, 4, 3, 3, 2, 1, 1, 0), . . . .

Figure 3:
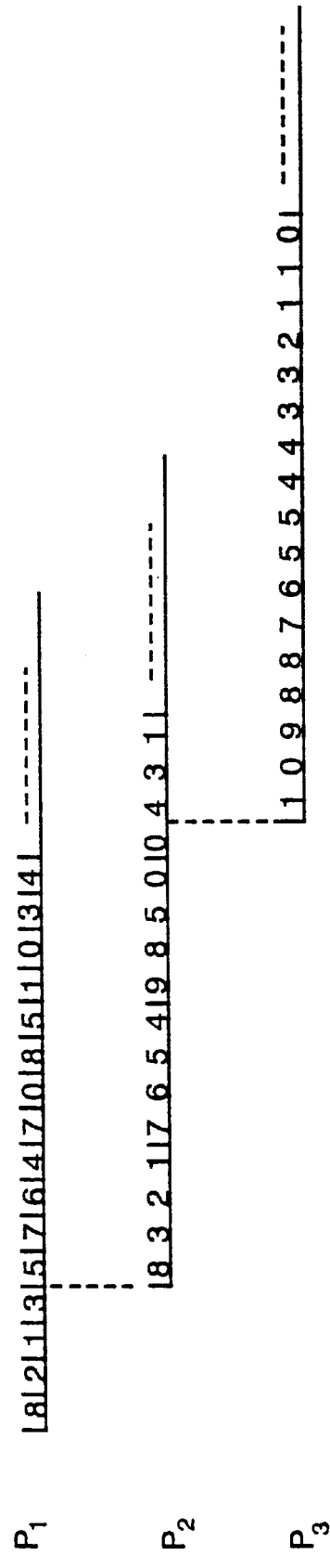
FIG. 3 shows a sorting process performed by the sort processing device.

The sort processor 13 of the third stage performs the same process. This process is shown in FIG. 3. As shown in FIG. 3, it is possible for the processors of the respective stages to start its process before the processor of the preceding stage completes its process. Therefore, when data are inputted continuously, the sort result is outputted with a little delay time in parallel to the input of the data.

In this manner, n sort processors rearrange $K^n$ data, that is, perform sorting processes on $K^n$ data. In other words, the sorting of N data is achieved by $\log_K N$ sort processors. For example, to sort $2^{20}=4^{20}$=a million of data, according to the conventional method of comparing two data at a time, twenty sort processors have been necessary. On the other hand, according to the present method where K=4, only 10 sort processors are necessary. The respective sort processors of the present invention use the data storage devices 15, 16, 17 and 18 which are connected to the respective sort processors as a storage region.

An internal operation of respective sort processors is explained below using FIG. 1. In this example, it is assumed that the sort processor 12 is inputted with the data strings (8, 3, 2, 1), (7, 6, 5, 4), (9, 8, 5, 0), (10, 4, 3, 1), . . . from the sort processor 11 of the preceding stage. The sort processor 12 then merges these data strings to form a data string (10, 9, 8, 8, 7, 6, 5, 5, 4, 4, 3, 3, 2, 1, 1, 0) . . . , and outputs the data string to the sort processor 13 of the succeeding stage.

First of all, the data strings (8, 3, 2, 1), (7, 6, 5, 4), (9, 8, 5, 0) are inputted to the sort processor 12 from the input bus 126 and stored in the data storage device 16 connected to the sort processor 12, maintaining their order. At the same time when the data is stored in the data storage device 16, the key values of the top data "8" of the data string (8, 3, 2, 1), the top data "7" of the data string (7, 6, 5, 4) and the top data "9" of the data string (9, 8, 5, 0) are stored in the key value storage device 131, 132 and 133, respectively. At this point, the fourth key value storage device 134 out of the four key storage devices is left empty. In this key value storage device 134, the key value of the fourth data string (10, 4, 3, 1) is stored. In other words, corresponding key value storage device is assigned to the key value of the respective data strings and fixed as follows.

The first key value storage device 131: the key value of the first data string The second key value storage device 132: the key value of the second data string The third key value storage device 133: the key value of the third data string The fourth key value storage device 134: the key value of the fourth data string The operation above is controlled by the controller 125.

Secondly, the controller 125 controls the comparator 130 to compare the data inputted from the first, second and third key storage devices 131, 132, 133 corresponding to the first K−1 key values where key values are stored, with the data (key values) of the latch register 135.

Then, the fourth remaining data string (10, 4, 3, 1) is inputted in sequence to the input bus 126 from the sort processor 11 of the preceding stage. The sort processor 12 stores the key value of its top data "10" for every 4 bytes in the latch register 135 in sequence, and compares it with the data stored in the key value storage devices 131, 132, 133 in every 4 bytes. Simultaneously, the key value portion of the inputted data is stored in the key value storage device 134 which has been left empty.

To explain in more detail, when the first four bytes of the key value of the data "10" is stored in the latch register 135, the comparison begins in the comparator 130 simultaneously. In this example, since the data "10" is the largest, the key value of the data "10" is stored in the latch register 135 for every four bytes. The data "10" may also be stored in the data storage device 16 in the same manner as other data strings.

In the comparator 130, the data "8", "7", "9" and "10" are compared. As a result, the largest data "10" is outputted. In case that the data inputted in the latch register 135 is outputted as it is to the next stage as a result of comparison, as seen in example, the key portion of this data is outputted from the comparator 130 to the sort processor 13 of the succeeding stage via the data output bus 127. Generally, a data comprises a key portion and a non-key portion, for example, each data 8, 9, 2, 1 in a set of data (8, 9, 2, 1) indicates only the key portion. The key portion is succeeded by the non-key portion e.g. ([8, abc], [9, def], [2, abc], [1, xyz]), wherein "abc", "def", "abc","xyz" indicate the non-key portions. When the data includes the non-key portion, the non-key portion of the data inputted from the data input bus 126 is outputted as it is to the sort processor 13 of the succeeding stage via the data output bus 127. These processes are controlled by the controller 125.

Next, the data "4" following the data "10" in the fourth data string is inputted from the input bus 126. This data "4" is inputted to the latch register 135 for every four bytes, in the same manner as that of the data "10", and is compared for every four bytes with the data "8", "7" and "9" stored in the key value storage devices 131, 132 and 133. At the same time when the data "4" is inputted to the latch register 135, the key value of this data "4" is stored in the key value storage device 134 which had been left empty.

In this comparison, the data "9" stored in the key value storage device 133 is outputted as a result of the comparison instead of the data inputted to the latch register 135. Therefore, in this case, the key portion of the data "9" is outputted to the sort processor 13 of the succeeding stage from the comparator 130 via the data output bus 127. If there is a non-key data portion of the data "9", the non-key portion of the data "9" is read out from the data storage device 16 and outputted to the sort processor 13 of the succeeding stage via the data output bus 127. After the comparison of the key value has been completed, if there is a data portion in the data "4" which does not follow to the key value, this data portion is transmitted from the sort processor 11 of the preceding stage via the data input bus 126, and is sent to the data storage device 16 and stored therein.

At this time, the key value of the data "4" is stored in the key value storage device 134 which had been left empty (with the remainder of unnecessary data after the output of necessary data to the sort processor of the succeeding stage), and the key value storage device 133 in which the key value of the data "9" has been stored earlier is left empty. Therefore, the controller 125 controls the comparator 130 to compare the data from the data input ports 136, 137, 139 and 140.

After the control of the comparator 130 has been completed, the key value of the data "8", which follows the data "9" in the data string (9, 8, 5, 0) is read out for every four bytes and stored in the latch register 135, which is connected to the comparator 130. The comparator 130 compares the stored data with the data "8", "7" and "4" stored in the other key value storage devices 131, 132 and 134 for every four bytes. This comparing operation starts simultaneously when the first four bytes of the key value of the data "8" are stored to the latch register 135. The key value of the data "8" is stored in the latch register 135, while at the same time it is stored in the key value storage device 133. Simultaneously, the data "3" which follows the data "4" in the data string (10, 4, 3, 1) transmitted from the sort processor 11 of the preceding stage via the data input bus 126 is stored in the data storage device 16.

Figure 4:
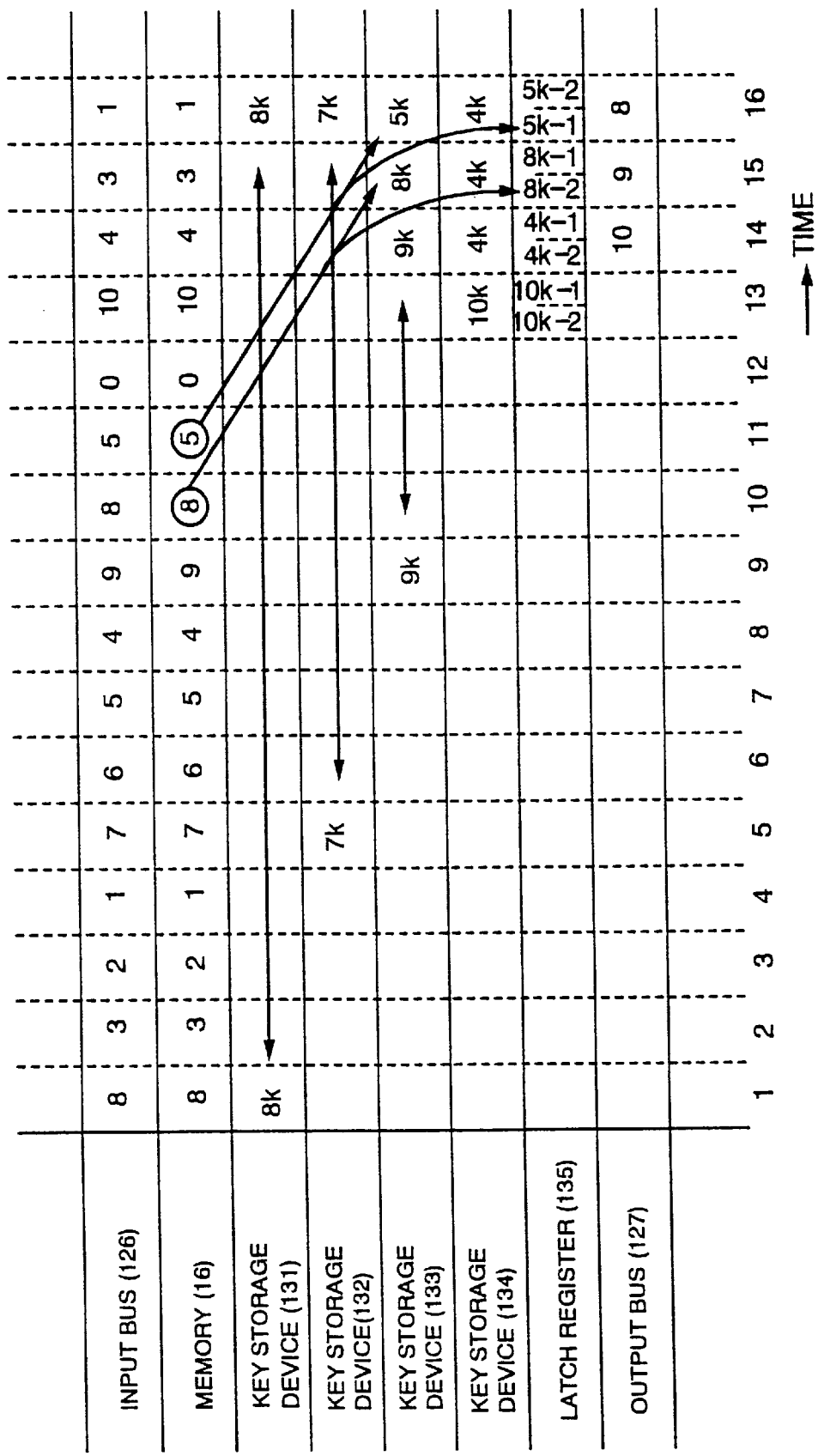
FIG. 4 shows a flow of the data in sort processing by the sort processors.

FIG. 4 shows a data flow in the above-explained sort processing. In FIG. 4, the key value of the data "10" is shown as $10_K$, and the first and the second four bytes of the key value of the data "10" are shown as $10_K$–1 and $10_K$–2. In the example of the FIG. 4, the key value is assumed to be 8 bytes (4 byte×2). In FIG. 4, the time increases from left to right on the horizontal axis. The FIG. 4 also shows an operational state of the sort processor in the second stage.

The data is inputted from the preceding stage to the input bus 126 in the order of 8, 3, 2, 1, 7, 6, 5, 4, . . . . This input data from the preceding stage is shown in the top line of FIG. 4. These data are grouped for every sorted data as shown in the following.

8, 3, 2, 1
7, 6, 5, 4
9, 8, 5, 0
10, 4, 3, 1

These data are sequentially stored in the storage device 16 as shown in the second line in FIG. 4. The top data of respective sets of data are written in the corresponding key storage devices, for example, the top data "8" of the data set (8, 3, 2, 1) is written in the key data storage device 131, the top data "7" of the data set (7, 6, 5, 4) is written in the key data storage device 132, the top data "9" of the data set (9, 8, 5, 0) is written in the key value storage device 133, the top data "10" of the data set (10, 4, 3, 1) is written in the key value storage device 134 as shown in the third line to sixth line of FIG. 4 corresponding to the time of 1, 5, 9, 13 of the horizontal axis.

Regarding the last key value "10", since the comparison is started without waiting to store this value in the key storage device 134, the key value "10" is stored in the latch register 135 for every four bytes at the same time when the key value "10" is stored into the key storage device 134.

When the first four bytes of the key value "10" are stored in the latch register 135, each top data "8", "7", "9" in the key value storage device 131–133 and the data "10" in the latch register 135 are compared. In this case, the contents in the key storage device 131–133 and the content in the latch register is effective, and the content in the key storage device 135 where the last data is stored is non-effective.

As a result of the comparison process, the data "10" having the maximum value is selected and outputted to the output bus 127.

Next, since the succeeding data in the data set (10, 4, 3, 1) is "4", the key portion of "4" is stored in the key storage device 134 where the data "10" have been stored. The key "4" is stored in the latch register 135 for every four bytes at the same time when the key "4" is stored into the key storage device 134. When the first four bytes of the key "4" are stored in the latch register 135, each top data "8", "7", "9" in the key storage device 131–133 and the data "4" in the latch register 135 are compared at the time 14 in the horizontal axis. In this case, the contents in the key storage device 131–133 and the content in the latch register is effective, and the content in the key storage device 133 where the last data is stored is also non-effective. As a result of the comparison process, the data "9" having the maximum value between the compared data is selected and outputted to the output bus 127.

Next, since the succeeding data in the data set (9, 8, 5, 0) to the top data "9" is "8", the key portion of "8" is stored in the key storage device 133 where the data "9" have been stored. The key "5" is stored in the latch register 135 for every four bytes at the same time when the key "5" is stored into the key storage device 133. When the first four bytes of the key "5" are stored in the latch register 135, each top data "8", "7" in the key storage devices 131, 132 and the data "5" in the latch register 135 are compared at the time 15 in the horizontal axis. In this case, the contents in the key storage devices 131, 132, 134 and the content in the latch register 135 is effective, and the content in the key storage device 133 where the last data is stored is also non-effective. As a result of the comparison process, the data "8" having the maximum value between the compared data is selected and outputted to the output bus 127.

A similar process occurs for the succeeding data, and the contents in the key storage device where the data is stored according to the preceding comparison process are made non-effective and the content in the latch register is made effective at the current comparison. Accordingly, the comparison is carried out without delay.

In the above explanation, it is mentioned that, after the data "9" is outputted, the key value portion of the data "8" is read out from the data storage device 16, and stored in the key value storage device 133 and in the latch register 135 for every four bytes in sequence. In the construction of the sort processor shown in FIG. 1 described above, the controller 125 uses the bus connected to the key value storage devices by means of time sharing. The data storage device 16, the key value storage device 131–134 and the latch register 135 may be connected by separate buses.

By repeating the above operation, the sort processing is completed. As the sort processing gets closer to the completion, the data in the four strings disappear. For example, in this case, the data strings (8, 3, 2, 1), (7, 6, 5, 4), (9, 8, 5, 0), (10, 4, 3, 1) . . . are inputted, and the sort processor 12 merges these four strings to output the data string (10, 9, 8, 8, 7, 6, 5, 5, 4, 3, 3, 2, 1, 1, 0), . . . . In outputting this merged data string, when the two "4's" are outputted, the data in the second data string (7, 6, 5, 4) disappears from the sort processor 12. The controller 125 controls the comparator 130 so that the corresponding key value storage device does not become the object of comparison for this data string.

The constructions of the data storage devices 15–18 are explained below. The data storage devices 15–18 each comprise a normal DRAM. For example, in performing sort processing on a million data of 64 MB memory, the prior art and the present invention are different in a manner shown in FIG. 5. In FIG. 5, the relation between the data storage device and the number of DRAMs necessary is shown in case that the comparison data at a time is changed. Compared to the conventional art, the present invention is able to reduce the amount of hardware. FIG. 5 shows that the number of DRAMs necessary for sorting the same amount of data and the number of the sort processors become minimum when K is 4. If K is selected as K=22=4, K=24=8, K=2$^n$ (where n is an integer) as shown in FIG. 5, the number of DRAMs can be decreased and the mounting area of the DRAMs can be also decreased.

As explained above, it is possible to solve the problem in mounting the sort processors into the LSI, caused by the limitation on the number of pins in one LSI.

Moreover, by solving the mounting problem in the LSI, it is possible to reduce the number of the sort processors in the sort processing device. Therefore, the hardware scale of the sort processing device can be reduced, at the same time it is also possible to minimize the sort processing device for sorting a constant amount of data.

Furthermore, it is also possible to reduce the number of the DRAMs in the data storage devices used in the sort processors, and to minimize the sort processing device.

In addition, if a sort processor is constructed according to the present invention, the performance does not deteriorate even if the number of the access to the data storage device is increased.

In case that a key portion comprises a plurality of small key portions and each small key portion is assigned to an ascending sort order or to a descending sort order, respectively, the sort processor simply performs a sort in a descending or an ascending order by inverting sign bits of any small keys in the preceding process. For example, if the key is as "00010100" in which the value "0001" of the first small key is assigned in the ascending order and the value "0100" of the second small key is assigned in the descending order, the value of the second key is inverted such as "1011" and the key including both the first small key and the second small key such as "00011010" is sent to the sort processor. In this case, the sort processor simply performs the sort in the ascending order by using the single ascending key comprised of two bites value "00011010". Therefore, the hardware of the sort processor can be simplified.

What is claimed is:

1. A sort processor for arranging data strings in an assigned order comprising:
   a data storage device for storing input data strings;
   a comparator having (K+1) input ports, K being an integer larger than 1, for inputting K continuous sets of comparison data of the input data strings and for comparing data from K of the input ports, wherein K of the input ports of said comparator include data storage devices for storing K data for comparison, the (K+1)$^{th}$ input port including a register, and K data are compared by comparing data input from (K−1) input ports of said K input ports with data input from the register; and
   a controller for selecting an input port from which sets of data are input to said comparator.

2. The sort processor according to claim 1, wherein said data storage device stores only key values of data being compared.

3. The sort processor according to claim 2, wherein K input data strings correspond to K key storage devices for storing the key values of the K data, respectively.

4. The sort processor according to claim 2, wherein, during pre-processing for a comparison process, the controller stores the key values of K−1 data of the data in the K continuous data strings being compared in (K−1) key value storage devices of said K key value storage devices and, at the same times when top portions of the key values of the K data are stored in the register, the controller selects input ports corresponding to said (K−1) key value storage devices and an input port connected to the register to start the comparison process, and stores K-th data in the K-th key value storage device.

5. The sort processor according to claim 4, wherein, at the beginning of a first comparison process, said controller stores the top portions of the respective data strings in said data storage device when said controller stores the (K−1) data strings being compared in said data storage device, and stores in parallel the key values corresponding to the respective data in said key value storage devices.

6. The sort processor according to claim 2, wherein, in second comparing processes subsequent to the comparison process, said comparator determines which data are to be arranged in an assigned order from the comparison of the key values of the K data, and outputs these data to a sort processor in a next stage, and said comparator stores the key value of following data instead of the output data in the register to start a third comparing process, and stores this key value in said key value storage device, in which the key value of the output data has been stored, for sort processing in parallel.

7. The sort processor according to claim 6, wherein said comparator selects one of the smallest data value or the largest data value.

8. The sort processor according to claim 6, wherein, when the data stored in said register is output according to the comparison by said comparator, said controller stores a key value of the data following the output data in the data string to which the outputted data belongs in said register to start the comparing process of the comparator, at the same time the key value of this data following the output data is stored in a key value storage device where the key value of the output data had been stored.

9. The sort processor according to claim 2, wherein, when no more data except output data resulting from comparison in said comparator remains, said controller does not select the input sort of said comparator corresponding to the key value storage device in which the key value of the data had been stored.

10. The sort processor according to claim 1, wherein the value of K is defined as $K=2^n$, n being an integer larger than 1.

11. A sort processing device wherein a plurality of sort processors according to claim 1 are integrated in a single semiconductor chip.

12. A sort processing device, wherein a plurality of sort processors according to claim 1 are connected in series.

13. A sort processing device comprising:
a plurality of sort processors connected in series, each of said sort processors comprising:
a data storage device for storing input data strings;
a comparator having (K+1) input ports, K being an integer larger than 1, for inputting K continuous sets of comparison data of the input data strings and for comparing data from K of the input ports; and
a controller for selecting an input port from which sets of data are input to said comparator; and
a key converter for inverting bits of key values having a different assignment from said comparator and transmitting an inverted key value to a sort processor.

14. A sort processing device comprising:
a plurality of sort processors, each sort processor comprising:
a data storage device for storing input data strings;
a comparator for comparing values of continuous comparison data of the data strings; and
a controller for controlling said data storage device and said comparator, wherein said plurality of sort processors operate in parallel and repeatedly use respective comparators to sort a plurality of data; and
a key converter for inverting bits of key values having a different assignment from said comparator and transmitting inverted key values to a sort processor of a first stage.

* * * * *